UNITED STATES PATENT OFFICE 2,686,092

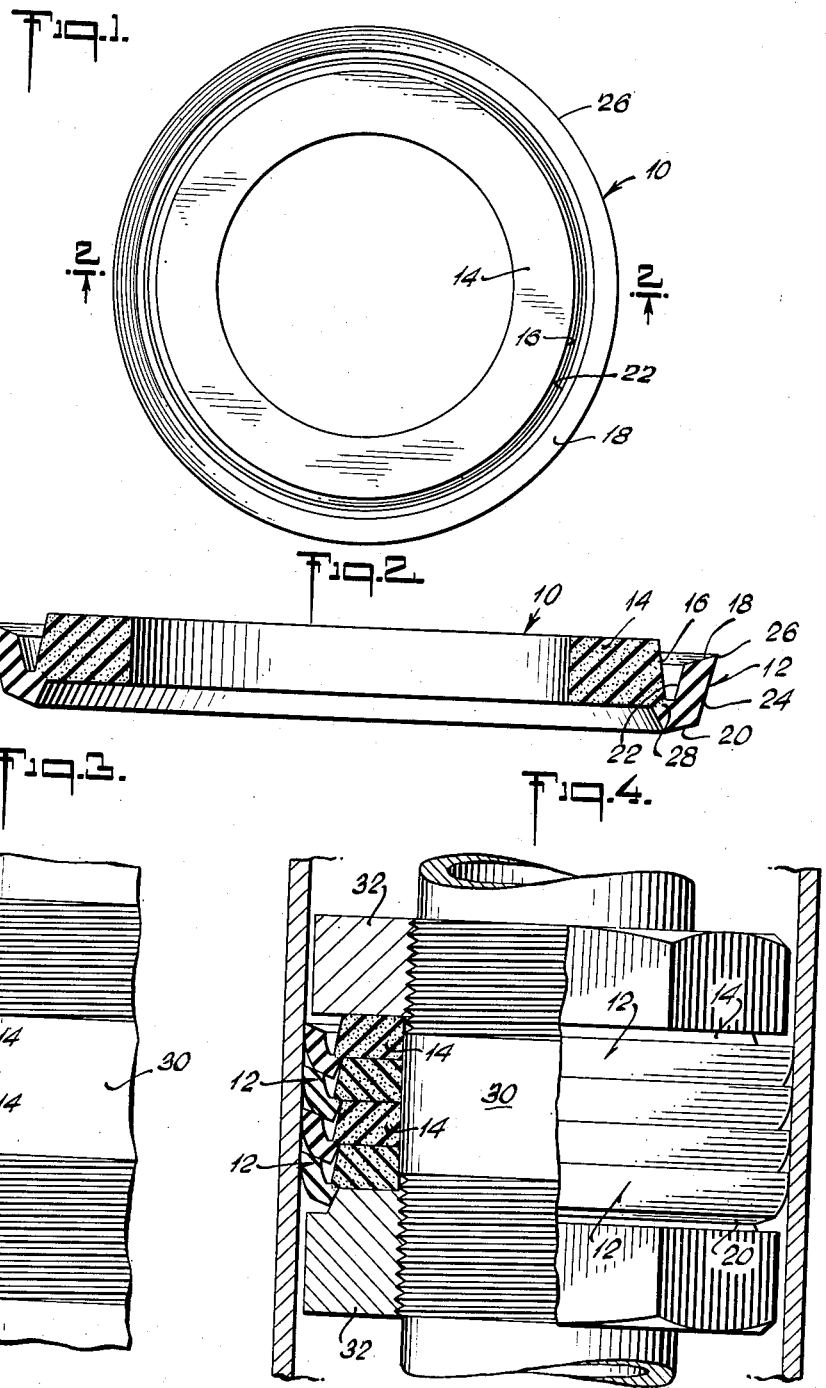

PUMP ROD PACKING

Gerald W. Neesen, Somerville, N. J., assignor to Johns-Manville Corporation, New York, N. Y., a corporation of New York Application November 14, 1950, Serial No. 195,518

2 Claims. (Cl. 309—33)

The instant invention relates to packings for making relatively fluid-tight seals between fixed and movable parts of equipment, such as pumps, compressors, hydraulic presses, and the like. The packings may be used for sealing against water, oil, steam, gas and other media, but the invention has for its principal object the provision of a packing especially adapted for rod pumps used in the pumping of oil wells. An object of the invention is also the provision of a packing which will increase the efficiency of the pumping operation and prolong the period between repackings.

Another object of the invention is the provision of a packing which will permit free movement of the sealing lip, irrespective of the gland pressure applied to the packings in the stuffing box. The invention is embodied in a construction which prevents distortion of the sealing lip or the pressing of a set of rings into a substantially solid mass, by gland pressure.

Another object of the invention is the provision of a packing ring of such construction that the sealing lips of the rings of a set support the lip sections of adjacent rings whereby the rings are maintained against collapse or distortion under high service pressure.

Another object of the invention is the provision of a packing set in which open spaces are provided between the lip of a packing and the heel of an adjacent packing, to allow fluid pressure to exert its force on each individual lip.

My invention will be more fully understood and further objects and advantages thereof will become apparent when reference is made to the more detailed description of the invention which is to follow and to the accompanying drawings in which:

Fig. 1 is a top plan view of a packing ring embodying the instant invention;

Fig. 2 is a sectional view on an enlarged scale, taken on the line 2—2 of Fig. 1;

Fig. 3 is a view partially in section and partially in elevation illustrating the packings of the instant invention in position on a pump rod; and, Fig. 4 is a view partially in section and partially in elevation illustrating the condition of the packings with the rod installed in a casing element.

Referring now to the drawings, there is shown a packing ring comprising an annulus 10 and consisting of a lip section 12 carried by and extending angularly away from a body section 14. As illustrated, the body section preferably projects above the lip section. The body section is constructed to have greater resistance to compression and distortion than the lip section to resist axially applied pressure, such as gland pressure and, hence, prevent distortion of the lip sections of adjacent rings through their being jammed together or against the end of the box. The desired rigidity and compression-resistance of the body section may be obtained in any suitable way. Both the lip and body sections will ordinarily be formed of multiple layers of a fabric, such as asbestos, cotton, or the like, depending upon the field of use of the packing, impregnated or coated with natural rubber or any of the synthetic rubbers, again depending upon the field of use of the packing. The proper selection of the fabric and rubber for different conditions is well understood in the art. To reinforce and rigidify the body section, it has been found preferable to impregnate the fabric of this section with a stiffening resin; for example, a phenol-formaldehyde, urea-formaldehyde, vinyl, or other hardenable resin, preferably of the heat setting type available on the market. The impregnation of the fabric of the body section with such resin gives the body section the desired properties. However, any other suitable way of hardening this section may be used.

In making the packing the multiple layers of fabric for the body section are first impregnated with the selected hardening resin and these and the multiple layers of fabric for the lip section are impregnated or coated with the selected rubber binder. The fabric carrying the binder is then placed in a mold of the desired contour and subjected to heat and pressure. The fabricating operations, except for the special shape of the mold and the use of resin impregnated fabric for the body section, follow conventional practice.

Body section 14 is substantially rectangular in cross-section except that it has an outwardly sloping outer face 16. Lip section 12 is substantially parallelogrammatic in cross-section and has an outwardly and upwardly inclined upper face 18 and preferably a parallel lower face 20, and upwardly and outwardly inclined side walls 22 and 24, respectively. Side wall 24 and upper wall 18 define a sealing lip 26. The lip section is connected to the body section by a relatively narrow, downwardly and outwardly inclined neck section 28 of preferably the same characteristics with respect to deformability and yieldability as the lip section, and which may be considered, if desired, as part of the lip section. A recess is thus provided to receive the upper portion of the body section of an underlying ring.

The packing rings are illustrated in Figs. 3 and 4 in position on the rod of a pump, such as a sucker rod pump employed in oil field service. Such pumps are conventionally used in the pumping of oil wells and, inasmuch as they are well known, the details have not been shown. As illustrated in Figs. 3 and 4, preferably a plurality of the rings are mounted on the rod 30 and confined between glands 32, suitably threaded onto the rod. Under the pressure of the glands the body sections 14 of the several rings are brought into closely adjacent relationship. However, due to the continuity of the relatively non-yieldable, compression-resistant body sections from end to end of a set of the packing rings, the pressure exerted by the glands will be resisted entirely by the body sections and no distortion of the lips or pressing of the set into a solid mass by excessive pressure, as often occurs with other types of packings, takes place. Hence, a free space will always be provided for each lip to perform its sealing function, irrespective of pressure variations.

As illustrated particularly in Fig. 3, the lip sections of the packings, when the packings are not confined within the casing, are spaced from the lip sections of adjacent packings. However, when the rod is in working position within the casing, as illustrated in Fig. 4, the upper face 18 of the lip section of one packing rests against, or substantially against the lower surface of a lip section of a superposed packing. The lip sections are thus supported against collapsing or turning inside-out under high service pressures. If desired, by applying cement on the adjacent surfaces of the body section, a cartridge type packing may be produced. Each ring is a complete packing unit and may be used alone where only one ring is required, or may be used with others, as illustrated in the drawings. It will also be noted that at no point is there a solid line of packing between the rod and the casing. Hence, swelling of the packing may occur without injury to the packing or reduction of its efficiency as a seal.

Having thus described my invention in rather full detail, it will be understood that these details need not be strictly adhered to and that further changes and modifications may suggest themselves to one skilled in the art, all falling within the scope of the invention as defined by the subjoined claims.

What I claim is:

1. In a packing set, a pair of packing rings assembled in axially adjacent relation, one forward of the other, each of said packing rings comprising an annular body section resistant to compression and distortion and having substantially flat and parallel forward and rearward end surfaces and side wall surfaces on opposite sides of the body section extending generally axially of the ring, a single annular lip section having less resistance to compression and distortion than the body section and having a forward portion extending forwardly alongside one of said side wall surfaces and spaced therefrom, and a relatively flexible neck section connecting said lip section to said body section, the rearward end of the body section of the forward ring being in abutment with the forward end of the rearward ring, the neck section of the rearward ring joining its lip section to its body section adjacent the rearward end of its body section, the lip section of at least the forward ring having a rearward portion extending rearwardly of the body section of the forward ring and disposed alongside the forward end of the body section of the rearward ring to provide a clear space laterally adjacent of the forward end of the body section of the rearward ring to accommodate flexure of the lip section of the forward ring about its neck section in the assembled set, the other side wall surfaces of said body sections of said rings, on the side thereof remote from their respective lip sections, being shaped to fit complementally against one of the elements to be sealed.

2. The invention defined in claim 1, in which each of said lip sections is inclined forwardly and laterally away from the body section of its respective ring, and in which the lip section of the rearward ring has a forward end having a portion lying laterally beyond the laterally outer portion of the rearward end of the lip section of the forward ring, and a portion lying axially rearwardly of and closely adjacent to the laterally outer portion of the rearward end of the lip section of the forward ring in loosely assembled relation but adapted to come into contact therewith under operative conditions.

References Cited in the file of this patent

UNITED STATES PATENTS

| Number | Name | Date |
| --- | --- | --- |
| 1,992,967 | Roy | Mar. 5, 1935 |
| 2,081,040 | King | May 18, 1937 |
| 2,284,340 | Nuckles | May 26, 1942 |
| 2,364,383 | Neesen | Dec. 5, 1944 |

FOREIGN PATENTS

| Number | Country | Date |
| --- | --- | --- |
| 14,517 | Great Britain | June 23, 1913 |
| 544,981 | Great Britain | May 6, 1942 |
| 545,556 | Great Britain | June 2, 1942 |